Figure 1:
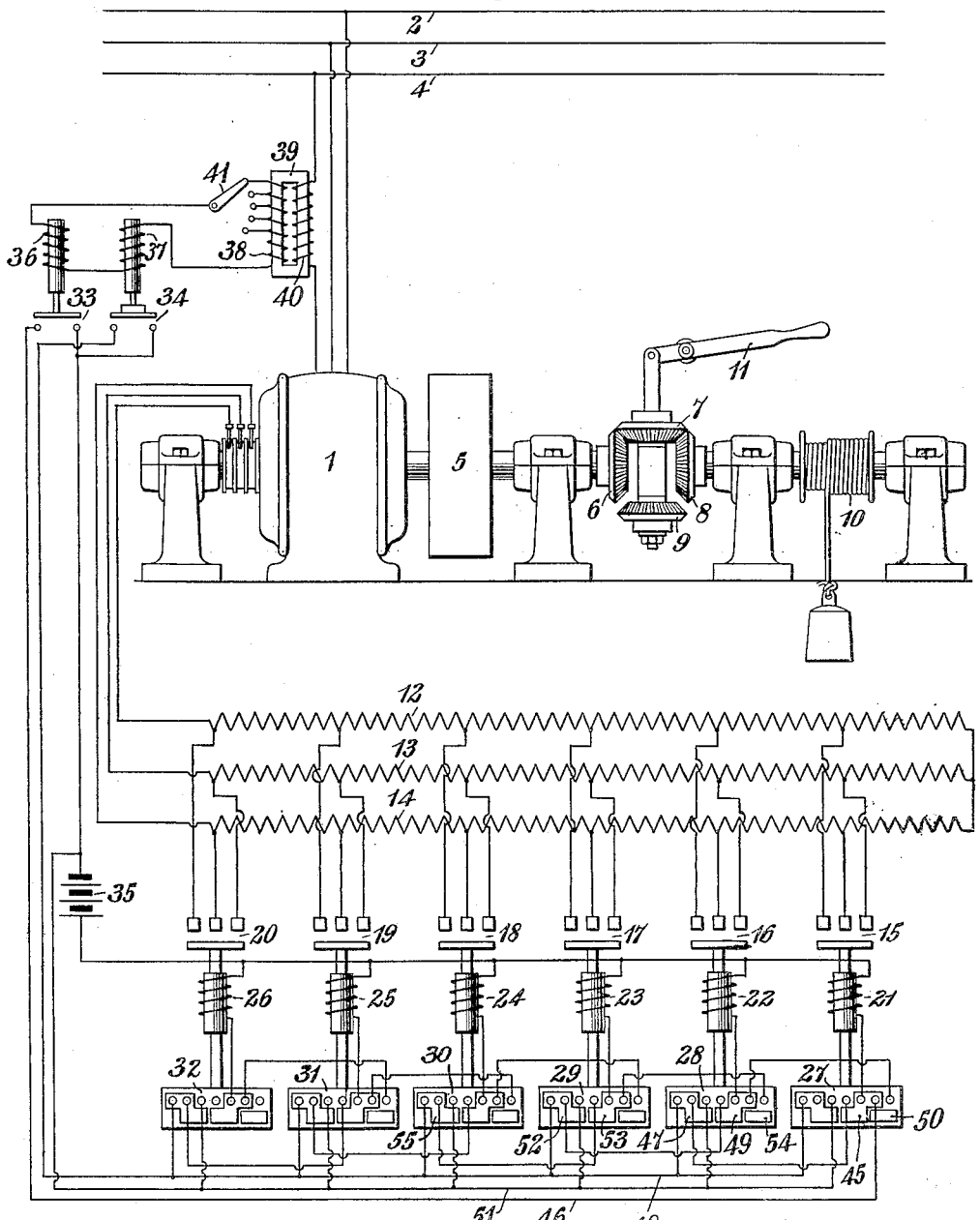

H. D. JAMES.
SYSTEM OF CONTROL.
APPLICATION FILED OCT. 3, 1906.

924,666.

Patented June 15, 1909.
2 SHEETS—SHEET 1.

WITNESSES:
C. L. Belcher
Otto S. Schairer

INVENTOR
Henry D. James
BY
Wesley G. Carr
ATTORNEY

H. D. JAMES.
SYSTEM OF CONTROL.
APPLICATION FILED OCT. 3, 1906.
924,666.
Patented June 15, 1909.
2 SHEETS—SHEET 2.
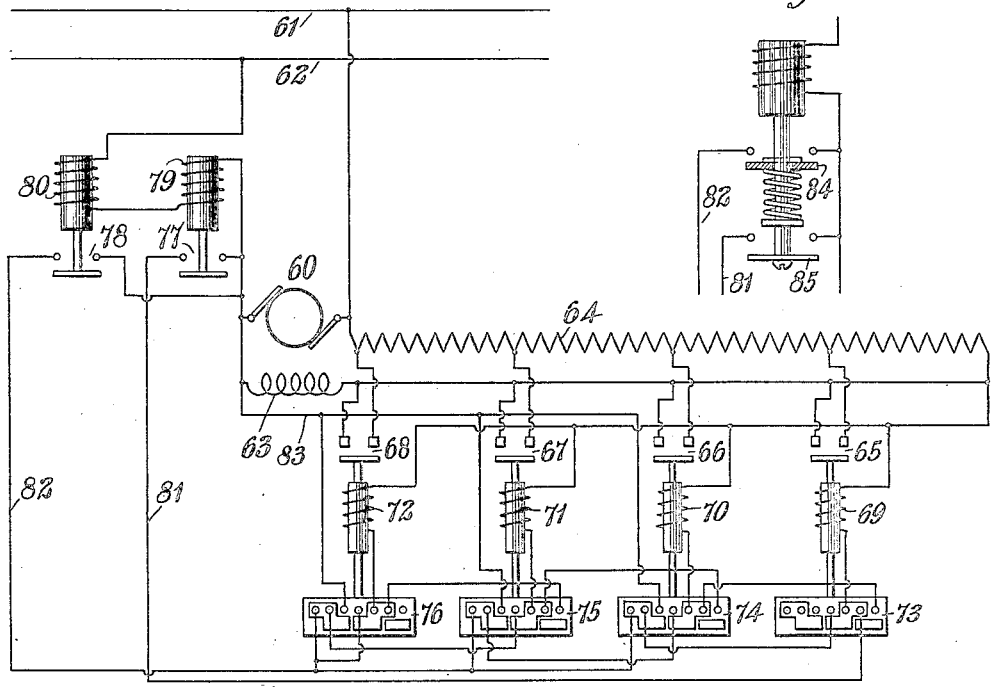
Fig. 2.
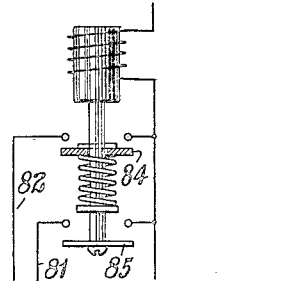
Fig. 3.
Fig. 4.
WITNESSES:
C. L. Belcher
Otto S. Schainer.
INVENTOR
Henry D. James
BY
Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

No. 924,666.      Specification of Letters Patent.      Patented June 15, 1909.

Application filed October 3, 1906. Serial No. 337,278.

*To all whom it may concern:*

Be it known that I, HENRY D. JAMES, a citizen of the United States, and a resident of Pittsburg, in the county of Allegheny and State of Pennsylvania, have invented a new and useful Improvement in Systems of Control, of which the following is a specification.

My invention relates to control systems for electric motors, and particularly to systems for the control of motors that are employed to operate large variable loads such as hoists and rolling mills.

The object of my invention is to provide simple and effective means whereby the speed of a motor, that is employed as above indicated, may be so governed, that a flywheel driven by a motor may be caused to absorb energy when the load is light and yield it when the load is heavy, in order that the amount of current supplied to the motor may be maintained substantially constant, or less than a predetermined value, regardless of the variations in load.

In practicing the invention, the amount of resistance included in one of the circuits of a motor is governed by means of a plurality of separately actuated switches, that are dependent in operation upon the amount of current traversing the other motor circuit, and that may be caused to operate in either forward or reverse order so as to increase or decrease the amount of resistance, or vice versa.

Figure 1 of the accompanying drawings is a diagrammatic view of a system in which my invention is employed in the control of an alternating current induction motor. Fig. 2 is a diagrammatic view of a system in which the invention is employed in the control of a direct current motor. Fig. 3 is a modification of a portion of the system of Fig. 2, and Fig. 4 is a diagrammatic view of a further modification of the invention.

An alternating current motor 1 that is supplied from a suitable circuit, such as that comprising conductors 2, 3 and 4, is mechanically connected to a fly-wheel 5 and a gear 6 of a set comprising, further, gears 7, 8 and 9, that constitute a motion-reversing connection between the motor and a suitable variable load, such as hoisting mechanism 10. The one or the other of the gears 7 and 9 may be caused to mesh with gears 6 and 8 by means of a lever 11. The gear connection between the motor and the load is only representative of suitable means that may be employed for the purpose, and the hoisting mechanism may be replaced by a rolling mill or other device that constitutes a variable load for the motor.

The amounts of a plurality of resistances 12, 13 and 14 that are included in the secondary circuit of motor 1 are adjusted by means of switches 15, 16, 17, 18, 19 and 20 having operating or controlling magnet windings 21, 22, 23, 24, 25 and 26, respectively, the circuits of which are controlled by means of interlocking switches 27, 28, 29, 30, 31 and 32 that are operated, respectively, by the switches 15 to 20, inclusive, and by relay switches 33 and 34. The magnet windings 21 to 26, inclusive, may be supplied with current from any suitable source, such as a battery 35. The switches 33 and 34 are provided with operating or controlling magnet windings 36 and 37, respectively, that are supplied with current from the secondary winding 38 of a transformer 39, the primary winding 40 of which is connected in series with one of the conductors by means of which current is supplied to the primary circuit of the motor 1. The switch 33 is so adjusted that it will be opened when the current supplied to the primary circuit of the motor is less than the value at which the switch 34 will be caused to open, and the current values at which the switches will open may be adjusted manually by means of a switch 41 that is adapted to vary the active lengths of the secondary winding 38 of the transformer 39.

In order to explain the operation of this system, let it be supposed that the motor 1 is connected to the hoist mechanism 10 and that the motor is supplied with such an amount of current that the switches 33 and 34 are maintained in the positions shown. Under such conditions the motor should operate at a slow speed in order that the kinetic energy previously acquired by the fly-wheel 5 may be yielded for the purpose of assisting in operating the hoist mechanism. Consequently, the resistances 12, 13 and 14 should be included in the secondary circuit of the motor, which will be the case, since the circuits of the magnet windings 21 to 26, inclusive, are interrupted by the relay switches 33 and 34. If the load upon the motor decreases somewhat, so that the amount of current taken by the motor from the supply circuit 2—3—4 decreases to such an amount that switches 33 and 34 are permitted to close, a circuit will be established from the battery 35 through magnet winding 21 of the switch 15, segment 45 of the interlocking switch 27, in the position shown, conductor 46, which may be termed the "pick-up" conductor, and switch 33 back to the battery 35. The magnet winding 21 being thus energized, closes the switch 15 which removes portions of each of the resistances 12, 13 and 14 from the secondary circuit of the motor 1, and this causes the speed of the motor to increase. Closure of the switch 15 also raises the interlocking switch 27 and the circuit of the magnet winding 21 is then completed by way of the segment 45 of the interlocking switch 27, in its uppermost position, segment 47 of the interlocking switch 28, in the position shown, conductor 48, which may be termed the "release conductor", and switch 34 back to the battery 35. It will be noted that the circuit of the magnet winding 21 cannot be interrupted except by the switch 34, which is opened when the current supply to the motor 1 exceeds a predetermined amount.

If the current supplied to the motor does not increase to an amount sufficient to cause the switch 33 to open, another circuit will be established from the battery 35, through magnet winding 22 of the switch 16, segment 49 of the interlocking switch 28, in the position shown, segment 50 of the interlocking switch 27, in its uppermost position, pick-up conductor 46 and switch 43, back to the battery 35. The magnet winding 22 being thus energized, closes the switch 16 which short-circuits other portions of each of the resistances 12, 13 and 14 in the secondary circuit of the motor 1, and thus causes a further increase in the speed of the motor. Closure of the switch 16 also raises the interlocking switch 28 to its uppermost position and the circuit of the magnet winding 15 then becomes established by way of segment 45 of the interlocking switch 27, in its uppermost position, segment 47 of the interlocking switch 28, in its uppermost position, and conductor 51, which may be termed the "retaining conductor", back to the battery 35. At the same time the circuit of the magnet winding 22 becomes established by way of segment 49 of the interlocking switch 28, in its uppermost position, segment 52 of the interlocking switch 29, in the position shown, release conductor 48 and switch 34, back to the battery 35. It will now be observed that the circuit of the magnet winding 22 cannot be interrupted except by the switch 34, and that the circuit of the magnet winding 21 is established independently of the switch 34 in such a manner that it cannot be interrupted while the switch 16 is closed. However, when the switch 16 opens, the relay switch 34 is again restored to its function of controlling the circuit of the magnet winding 21. If the relay switch 33 still remains closed, a circuit will be established from the battery 35 through magnet winding 23 of the switch 17, segment 53 of the interlocking switch 29, in the position shown, segments 54 and 50, respectively, of the interlocking switches 28 and 27, in their uppermost positions, pick-up conductors 46 and relay switch 33, back to the battery 35. The magnet winding 23 being thus energized, closes the switch 17 which removes a third section of the resistances 12, 13 and 14 from the secondary circuit of the motor 1, and thus causes the speed of the motor to correspondingly increase. Closure of the switch 17 also raises the interlocking switch 29 to its uppermost position, and the circuit of the magnet winding 22 is then changed so as to traverse the parts indicated by reference numerals 49 and 52, in their uppermost positions, and parts 51 and 34, opening of the switch 34 being thereby prevented from affecting the circuit of magnet winding 22 until the switch 17 again opens. At the same time, the circuit of the magnet winding 23 is reëstablished by way of the part bearing the reference numeral 53, in its uppermost position, the part 55, in the position shown, and the parts 48 and 34, the circuit being then under the immediate control of the switch 34. The switches 18, 19 and 20 will operate successively in a manner which will be readily understood from the foregoing description of the operation of the switches so long as the relay switch 33 remains closed.

If, during the process of removing sections of the resistances from the secondary circuit of the motor, the current supplied to the motor exceeds a predetermined amount, the switch 33 will open and, consequently, no more of the magnet windings 21 to 26, inclusive, will become energized, while the circuits of those which have been previously energized will not be interrupted unless the current supplied to the motor equals or exceeds the predetermined value at which the switch 34 will also be caused to open. When the switch 34 opens, the circuit of the last of the magnet windings 21 to 26 to be energized will be interrupted and the switches will open successively in the reverse order until a sufficient amount of resistance has been re-inserted in circuit with the secondary member of the motor. For instance, if both the switches 33 and 34 are opened when switches 15, 16 and 17 are closed, the last described circuit for the magnet winding 23 will become interrupted and the switch 17 will open. Opening of switch 17 lowers the interlocking switch 29, and the magnet winding 22 becomes disconnected from the retaining conductor 51 and becomes connected to the release conductor 48, the circuit in the latter instance being, as before described, by way of the segment 49 of interlocking switch 28, in its uppermost position, segment 52 of interlocking switch 29, in its lowermost position, release conductor 48 and relay switch 34. If, after another section of the resistance has thus been inserted in the secondary circuit of the motor, the current supplied to the motor should remain above the predetermined value at which the switch 34 is opened, the circuit of the magnet winding 22 will also be interrupted, and the switch 16 will open, thereby re-inserting another section of each of the resistances in the secondary circuit of the motor. At the same time, the interlocking switch 28 will be lowered, and the magnet winding 21 will become disconnected from the retaining conductor 51 and be connected to the release conductor 48 in a manner which will be understood from the foregoing description. If the current supplied to the motor then falls below the predetermined value at which the switch 24 is caused to open, the circuit of the magnet winding 21 and the switch 15 will remain closed. Thus, when the load upon the motor decreases, and the amount of current supplied thereto decreases correspondingly, the relay switches 33 and 34 are permitted to close, and one or more of the switches 15 to 20, inclusive, close in succession. The motor is thereby caused to increase in speed until the current supplied thereto exceeds the predetermined amount at which the switch 33 is caused to open. Then, so long as the current supplied to the motor remains between the predetermined limiting amounts at which the switches 33 and 34 operate, the amount of resistance in the secondary circuit of the motor will remain constant, and energy will be stored in the fly-wheel 5 because of the increased or high speed of rotation. If, however, the load upon the motor increases, the current supplied to the motor will increase in amount, and both the switches 33 and 34 will be caused to open. The switches 15 to 20, inclusive, will then open successively in the reverse order until a sufficient amount of resistance has been re-inserted in the secondary circuit of the motor to cause it to decrease in speed and permit the current supplied to the primary member of the motor to decrease to less than the amount at which the switch 34 is caused to open. On account of the decreased speed of the motor, the stored energy in the fly-wheel is utilized to operate the hoist mechanism or other load, whatever its nature may be. The amount of current taken from the supply circuit 2—3—4 may, in this manner, be maintained substantially constant by proper adjustment of the switches 33 and 34, or between the predetermined current values at which the said switches are caused to operate. Substantially the same means may be employed in the control of a direct current shunt wound motor, as illustrated in Fig. 2, in which a motor 60 is supplied from any suitable circuit, such as that comprising conductors 61 and 62, in circuit with shunt field magnet winding 63 of which a subdivided resistance 64 is included.

The amount of the resistance 64 included in the circuit of the shunt field magnet winding is controlled by means of a plurality of switches 65, 66, 67 and 68 having operating or controlling magnet windings 69 to 72, inclusive, the circuits of which are governed by means of interlocking switches 73, 74, 75 and 76 that are exactly similar in construction to the interlocking switches 27 to 32, inclusive, of Fig. 1, and relay switches 77 and 78, the functions of which correspond respectively to those of the switches 33 and 34 of Fig. 1. The switches 77 and 78 are provided with operating or controlling magnet windings 79 and 80 that are connected, in series with each other, between the supply conductor 62 and the motor 60, in order that their operation may be dependent upon the amount of current supplied to the motor, the switch 77 being adjusted to close at a higher current value than that at which the switch 78 is closed. It will be understood that, since resistance should be included in circuit with the shunt field magnet winding for the higher speeds, while, in Fig. 1, the highest speeds are attained by the motor when the least amounts of resistance are included in the secondary circuit, the switches 77 and 78 must necessarily differ somewhat in construction from switches 33 and 34, the former being normally open when the motor is operated at full speed with a light load, while the latter are normally closed under the same conditions.

In order to explain the operation of the system of Fig. 2, let it first be supposed that the motor is operated at full speed with a light load, all of the switches 69 to 72 and 77 and 78 being open, as shown, so that all of the resistance 64 may be included in circuit with the shunt field magnet winding 63. If, then, the load upon the motor increases above the predetermined amount at which the switch 77 becomes closed, the circuit of the magnet 69 will become energized, the circuit being established by way of interlocking switch 73 and pick-up conductor 81, which corresponds to pick-up conductor 46 of Fig. 1. One section of the resistance 64 is then short-circuited by the closing of the switch 65, the speed of the motor being, consequently, somewhat reduced, and the fly-wheel yields some of its power for driving the load. The interlocking switches 73 to 76, inclusive, and the control circuits therefor being substantially identical in structure and arrangement with those of Fig. 1, it will be understood that upon the raising of the interlocking switch 73, the magnet winding 69 becomes disconnected from the pick-up conductor 81 and is connected to release conductor 82 in circuit with which, switch 78 is included. One terminal of magnet winding 70 then becomes connected to the pick-up conductor 81 and the said magnet winding will become energized if the relay switch 77 remains closed, another section of the resistance 64 being thereby shunted, and the motor being further reduced in speed to permit the fly-wheel to assume a greater portion of the load. Upon closure of the interlocking switch 74, one terminal of the magnet winding 69 becomes connected to retaining conductor 83, and one terminal of magnet winding 70 becomes connected to release conductor 82. The switches continue to operate in this manner until the motor has decreased in speed sufficiently to permit the current supplied thereto to fall below the predetermined value at which the switch 77 is caused to close. Upon opening the switch 77, and so long as the current does not fall below the predetermined value at which the switch 78 is permitted to open, the amount of resistance in the shunt field circuit will remain constant. If, however, the switch 78 is permitted to open, the switches 69 to 72, inclusive, will open successively, in reverse order from that in which they closed, until sufficient resistance has been reinserted in the shunt field circuit to cause the motor to accelerate in speed and require a greater amount of current than that at which the switch 78 is permitted to open, or until all of the resistance 64 has been included in the circuit, the mode of operation of the system being readily understood from the foregoing description.

Structurally, the relay switches may assume many different forms, one which may be found convenient in practice because it requires but a single operating magnet winding being shown in Fig. 3. In this figure one of the movable contact members 84 is resiliently supported and normally is closer to the stationary contact members with which it is adapted to engage, and which are included in the circuit of pick-up conductors 82, than movable contact member 85 that is located in the circuit of the conductor 81. Thus, the current supplied to the motor must fall below a lower value to effect disengagement of the member 84 from its contact terminals then to effect disengagement of the member 85 from its contact terminals. The adjustment of the amount of resistance in one of the motor circuits may also be effected by means of a rheostat operated by a pilot motor, in a manner which will be understood from a consideration of Fig. 4, in which a rheostat 90 is connected in series with shunt field magnet winding 91 of a motor 92, that may be supplied from a suitable circuit, such as that comprising conductors 93 and 94.

The amount of resistance that is included in circuit with the shunt field magnet winding 91 is governed by means of a movable arm 95, that is operated by means of a motor 96, the direction of rotation of which is governed by means of two relay switches 97 and 98 that are included in circuit therewith.

The relay switches 97 and 98 are provided, respectively, with operating magnet windings 99 and 100, the circuit of the former of which is established by means of a relay switch 101 when the current supplied to the motor 92 falls below a predetermined amount, and the circuit of the latter of which is established by the switch 101 when the current supplied to the motor exceeds a predetermined value. Thus, if the current supplied to the motor falls below a predetermined amount, the relay switch 101 drops to its lowermost position and causes the magnet winding 99 to become energized, a circuit being then established through segment 102 of the relay switch 97, the armature of the pilot motor 96, segment 103 of the switch 97, and the field magnet winding of the pilot motor 96. The pilot motor will then operate the rheostat arm 95 toward the right and cause more resistance to be inserted in the shunt field circuit. The motor is thus caused to increase in speed, energy being thereby stored in the fly-wheel for use when the load upon the motor is increased. Between predetermined current values, the switch 101 will "float", or remain in substantially a mid position, and the switches 97 and 98 will consequently occupy their lowermost positions. When the current supplied to the motor exceeds a predetermined value, the relay switch 101 will be moved to its uppermost position and the circuit of the magnet winding 100 will be established thereby. When the switch 98 is moved to its uppermost position, a circuit is established through segment 104 of the relay switch 98, the armature of the pilot motor 96, segment 105 of the relay switch 98 and the field magnet winding of the pilot motor. The pilot motor will then be caused to operate in the opposite direction and the arm 95 will serve to shunt an increasing amount of the resistance 90. The field of the motor will then be strengthened and its speed correspondingly decreased so as to permit the fly-wheel to assume a portion of the load.

The invention has here been shown as applied to the control of motors that are directly connected to mechanical loads, but such illustrations have only been representative of the many uses to which the invention may be put. It will be found particularly useful in the control of motors that drive generators which in turn supply other motors that are directly connected to mechanical loads and the direction of rotation of which it may be desired to vary at will, such a system being set forth in another application, Serial No. 337,280 filed by me of even date herewith.

I claim as my invention:

1. The combination with a motor having an armature and a field magnet winding, and a variable load therefor, of a resistance for the circuit of the field magnet winding, a plurality of main switches, and interlocking and relay switches for causing said main switches to operate successively in order to effect an increase or decrease in the amount of active resistance according as the load becomes greater or less than a predetermined value.

2. In a control system, the combination with a plurality of separately actuated main switches, of automatically operated relay and interlocking switches which cause said main switches to operate successively in either forward or reverse order.

3. In a control system, the combination with a resistance and a plurality of separately actuated main switches, of automatically operated relay and interlocking switches which cause said main switches to operate successively in order to gradually increase or decrease the amount of the resistance included in a circuit.

4. In a control system, the combination with a plurality of switches, and controlling magnet windings therefor, of three control circuit conductors, and means for connecting the said conductors in succession to the magnet windings.

5. In a control system, the combination with a plurality of switches and controlling magnet windings therefor, of three control circuit conductors and interlocking switches operated by the main switches for connecting the said conductors in succession to the respective magnet windings.

6. In a control system, the combination with a main circuit, a plurality of switches and controlling magnet windings therefor, of three control circuit conductors, means for establishing circuits through two of said conductors when the current traversing the main circuit exceeds a predetermined amount, and means for interrupting the circuit of one of the latter conductors when the said current falls below a predetermined amount.

7. The combination with a motor and a resistance for one of the circuits thereof, of a plurality of separately actuated switches for governing the amount of active resistance, controlling magnet windings therefor, conductors which remain disconnected from a supply circuit except when the current traversing the other motor circuit exceeds a predetermined amount and to which the controlling magnet windings may become connected successively.

8. The combination with a motor, a resistance for one of the circuits thereof, a plurality of separately actuated switches for governing the amount of active resistance, and controlling magnet windings therefor, of a conductor to which the first magnet winding is normally connected, means for connecting the remaining magnet windings in succession thereto, means for connecting the conductor to a supply circuit when the current in the other motor circuit exceeds a predetermined amount, another conductor to which the magnet windings become connected successively, when energized, and that also becomes connected to a supply circuit when the current in the other motor circuit exceeds a predetermined amount, and a third conductor to which the respective magnet windings become connected when the preceding windings are energized.

9. In combination, a plurality of electrically controlled switches, an actuating circuit for said switches, a maintaining circuit for said switches, an overload responsive device arranged to coöperate with said maintaining circuit, and means for maintaining said overload device ineffective as to all switches except the last one which has closed.

10. In combination, a plurality of electrically controlled switches, an actuating circuit therefor, a maintaining circuit for said switches, an overload responsive device controlling said maintaining circuit, means controlled by each switch in closing for shifting its actuating coil from said actuating to said maintaining circuit, a second maintaining circuit and means controlled by each switch except the first in closing for shifting the actuating coil of the preceding switch from said first maintaining circuit to said second maintaining circuit.

11. In combination, a plurality of electrically controlled switches, an actuating circuit therefor, a notching relay controlling said actuating circuit, a maintaining circuit for said switches, an overload relay controlling said maintaining circuit, means controlled by each switch in closing for shifting its actuating coil from said actuating to said maintaining circuit, means controlled by each switch except the last in closing for completing the actuating circuit for the succeeding switch, a second maintaining circuit, and means controlled by each switch except the first in closing for shifting the actuating coil of the preceding switch from said first maintaining circuit to said second maintaining circuit.

In testimony whereof, I have hereunto subscribed my name this 28th day of September, 1906.

HENRY D. JAMES.

Witnesses:
EDWIN LEHR,
BIRNEY HINES.